United States Patent

Roth et al.

Patent Number: 5,843,579
Date of Patent: Dec. 1, 1998

[54] MAGNETIC THERMAL TRANSFER RIBBON WITH AQUEOUS FERROFLUIDS

[75] Inventors: Joseph D. Roth, Springboro; Richard B. Moreland, Centerville, both of Ohio

[73] Assignee: NCR Corporation, Dayton, Ohio

[21] Appl. No.: 671,051

[22] Filed: Jun. 27, 1996

[51] Int. Cl.⁶ ...................................... B41M 5/26
[52] U.S. Cl. ................. 428/484; 428/195; 428/206; 428/488.1; 428/403; 428/407; 428/692; 428/694 B; 428/913; 428/914
[58] Field of Search ...................... 428/195, 341, 428/303, 329, 484, 488.1, 500, 522, 206, 327, 403, 407, 692, 694 B, 913, 914

[56] References Cited

U.S. PATENT DOCUMENTS

| | | |
|---|---|---|
| 3,663,278 | 5/1972 | Blose et al. . |
| 3,979,756 | 9/1976 | Helinski et al. . |
| 4,025,448 | 5/1977 | Sudol . |
| 4,107,698 | 8/1978 | Galetto et al. . |
| 4,315,643 | 2/1982 | Tokunaga et al. . |
| 4,403,224 | 9/1983 | Wirnowski . |
| 4,416,751 | 11/1983 | Berkowitz et al. . |
| 4,430,239 | 2/1984 | Wyman . |
| 4,463,034 | 7/1984 | Tokunaga . |
| 4,564,534 | 1/1986 | Kushida et al. . |
| 4,604,222 | 8/1986 | Borduz et al. . |
| 4,628,000 | 12/1986 | Talvalkar . |
| 4,687,596 | 8/1987 | Borduz et al. . |
| 4,687,701 | 8/1987 | Knirsch et al. . |
| 4,698,268 | 10/1987 | Ueyama . |
| 4,707,395 | 11/1987 | Ueyama et al. . |
| 4,732,706 | 3/1988 | Borduz et al. . |
| 4,777,079 | 10/1988 | Nagamoto et al. . |
| 4,824,587 | 4/1989 | Kwon et al. . |
| 4,867,910 | 9/1989 | Meguro et al. . |
| 4,923,749 | 5/1990 | Talvalkar . |
| 4,983,446 | 1/1991 | Taniguchi et al. . |
| 4,988,563 | 1/1991 | Wehr . |
| 5,041,331 | 8/1991 | Glavin et al. . |
| 5,085,789 | 2/1992 | Yokouchi et al. . |
| 5,128,308 | 7/1992 | Talvalkar . |
| 5,240,626 | 8/1993 | Thakur et al. . |
| 5,240,781 | 8/1993 | Obata et al. . |
| 5,248,652 | 9/1993 | Talvalkar . |
| 5,348,348 | 9/1994 | Hanada et al. . |

*Primary Examiner*—Pamela R. Schwartz
*Attorney, Agent, or Firm*—Richard J. Traverso

[57] ABSTRACT

There is provided by the present invention a coating formulation and thermal transfer ribbons which provide printed images which are readable by magnetic ink character recognition (MICR) devices. These formulations and ribbons minimize the use of organic solvents in employing wax, binder resin and an aqueous based ferrofluid with magnetic pigment particles. MICR readable printed images are also provided as are thermal printers which employ the ribbons.

12 Claims, 1 Drawing Sheet

MAGNETIC THERMAL TRANSFER RIBBON WITH AQUEOUS FERROFLUIDS

FIELD OF THE INVENTION

The present invention relates to thermal transfer printing wherein images are formed on a receiving substrate by heating extremely precise areas of a print ribbon with thin film resistors. This heating of the localized area causes transfer of ink or other sensible material from the ribbon to the receiving substrate. The sensible material is typically a pigment or dye which can be detected optically or magnetically.

More particularly, the present invention is directed to aqueous based thermal transfer ink formulations and to thermal transfer media obtained therefrom which provide characters that are readable by magnetic ink character recognition (MICR) devices through the use of an aqueous based ferrofluid.

BACKGROUND OF THE INVENTION

Thermal transfer printing has displaced impact printing in many applications due to advantages such as the relatively low noise levels which are attained during the printing operation. Thermal transfer printing is widely used in special applications such as in the printing of machine readable bar codes and magnetic alpha-numeric characters. The thermal transfer process provides great flexibility in generating images and allows for broad variations in style, size and color of the printed image. Representative documentation in the area of thermal transfer formulations and thermal transfer media used in thermal transfer printing includes the following patents.

U.S. Pat. No. 3,663,278, issued to J. H. Blose et al. on May 16, 1972, discloses a thermal transfer medium having a coating composition of cellulosic polymer, thermoplastic resin, plasticizer and a "sensible" material such as a dye or pigment.

U.S. Pat. No. 4,315,643, issued to Y. Tokunaga et al. on Feb. 16, 1982, discloses a thermal transfer element comprising a foundation, a color developing layer and a hot melt ink layer. The ink layer includes heat conductive material and a solid wax as a binder material.

U.S. Pat. No. 4,403,224, issued to R. C. Winowski on Sep. 6, 1983, discloses a surface recording layer comprising a resin binder, a pigment dispersed in the binder, and a smudge inhibitor incorporated into and dispersed throughout the surface recording layer, or applied to the surface recording layer as a separate coating.

U.S. Pat. No. 4,463,034, issued to Y. Tokunaga et al. on Jul. 31, 1984, discloses a heat-sensitive magnetic transfer element having a hot melt or a solvent coating.

U.S. Pat. No. 4,628,000, issued to S. G. Talvalkar et al. on Dec. 9, 1986, discloses a thermal transfer formulation that includes an adhesive-plasticizer or sucrose benzoate transfer agent and a coloring material or pigment.

U.S. Pat. No. 4,687,701, issued to K. Knirsch et al. on Aug. 18, 1987, discloses a heat sensitive inked element using a blend of thermoplastic resins and waxes.

U.S. Pat. No. 4,698,268, issued to S. Ueyama on Oct. 6, 1987, discloses a heat resistant substrate and a heat-sensitive transferring ink layer. An overcoat layer may be formed on the ink layer.

U.S. Pat. No. 4,707,395, issued to S. Ueyama et al., on Nov. 17, 1987, discloses a substrate, a heat-sensitive releasing layer, a coloring agent layer, and a heat-sensitive cohesive layer.

U.S. Pat. No. 4,777,079, issued to M. Nagamoto et al. on Oct. 11, 1988, discloses an image transfer type thermosensitive recording medium using thermosoftening resins and a coloring agent.

U.S. Pat. No. 4,923,749, issued to Talvalkar on May 8, 1990, discloses a thermal transfer ribbon which comprises two layers, a thermal sensitive layer and a protective layer, both of which are water based.

U.S. Pat. No. 4,988,563, issued to Wehr on Jan. 29, 1991, discloses a thermal transfer ribbon having a thermal sensitive coating and a protective coating. The protective coating is a wax-copolymer mixture which reduces ribbon offset.

U.S. Pat. Nos. 5,128,308 and 5,248,652, issued to Talvalkar, each disclose a thermal transfer ribbon having a reactive dye which generates color when exposed to heat from a thermal transfer printer.

And, U.S. Pat. No. 5,240,781, issued to Obatta et al., discloses an ink ribbon for thermal transfer printers having a thermal transfer layer comprising a wax-like substance as a main component and a thermoplastic binder adhesive layer having a film forming property.

As demonstrated by the above patents, the selection of thermal transfer ribbons and formulations is diverse as are their end uses.

Thermal transfer printing has been widely used in printing magnetic ink character recognition (MICR). Representative documentation in this area includes U.S. Pat. No. 5,041,331, issued to Glavin et al. on Aug. 20, 1991. U.S. Pat. No. 5,041,331 describes a formulation using from 10 to 30 parts by weight magnetic oxide so that the resulting print will provide the desired level of signal transmission for machine scanning. While thermal transfer formulations and ribbons for MICR printing are known, organic solvents (i.e., isopropyl alcohol and toluene) are used to provide the necessary miscibility and compatibility with other components and provide the necessary volatility in fabricating the ribbon. It is desirable to provide thermal transfer formulations and thermal transfer ribbons which are not dependent on the use of organic solvents. The use of water-based systems or water-rich systems will simplify compliance with environmental regulations and restrictions.

Ferrofluids are widely known colloidal dispersions of finely divided magnetic particles in liquid carriers typically dispersed with the aid of a surfactant. Iron oxides (hematite and magnetite) are typically the magnetic particles within ferrofluids having a size ranging from 10 to 800Å. Ferrofluids have been incorporated in ink jet inks to provide greater control over the jet of ink as indicated in U.S. Pat. No. 4,107,698, issued to Goletto et al. on Aug. 15, 1978, and U.S. Pat. No. 3,979,756, issued to Helinski et al. on Sep. 7, 1976.

Ferrofluid compositions are described in the following patents:

U.S. Pat. No. 4,430,239, issued Feb. 17, 1984;
U.S. Pat. No. 4,416,751, issued Nov. 22, 1983;
U.S. Pat. No. 5,085,789, issued Feb. 4, 1992;
U.S. Pat. No. 4,867,910, issued Sep. 19, 1989;
U.S. Pat. No. 4,732,706, issued Mar. 22, 1988;
U.S. Pat. No. 4,604,222, issued Aug. 5, 1986; and
U.S. Pat. No. 4,687,596, issued Aug. 18, 1987.

A wide variety of liquid carriers for the ferrofluids are described in these references; however, they are primarily organic solvents such as, for example, polar solvents (U.S. Pat. No. 4,430,239), methylene chloride (U.S. Pat. No.

4,416,751), alkylpolyphenyl ether oils (U.S. Pat. No. 5,085, 789), hexane (U.S. Pat. No. 4,867,910), and polyols (U.S. Pat. No. 4,732,706). The use of organic fluids is also described in U.S. Pat. Nos. 4,604,222, 4,687,596 and 4,867, 910.

Water has been considered as a carrier fluid for ferrofluids as discussed by Berkowitz et al. in U.S. Pat. No. 4,41 6,751; however, stable aqueous ferrofluids are rare. Thakur et al. describes aqueous ferrofluids in U.S. Pat. No. 5,240,626. The colloidal suspension provided comprises magnetic particles which are coated with a carboxy functional polymer, preferably dispersed with the aid of surfactant and dispersant. Thakur et al. indicates these aqueous ferrofluids are used to provide magnetic recording media such as audio tape.

It is desirable to provide loadings of magnetic pigments and/or ferrofluids in coating formulations and products which are suitable for MICR recognition utilizing aqueous solvents so as to minimize or eliminate the use of organic solvents.

SUMMARY OF THE INVENTION

It is an object of the present invention to provide printed images from thermal printing that contain aqueous based ferrofluids in an amount sufficient to be recognizable by MICR devices.

It is another object of the present invention to provide a coating formulation which is water-rich or water-based and provides thermal transfer layers that form printed images which are recognizable by MICR devices.

It is the further object of the present invention to provide a coating formulation which contains an aqueous based ferrofluid in an amount sufficient to provide thermal transfer layers that form images which are recognizable by MICR devices.

It is another object of the present invention to provide a thermal transfer medium with a thermal transfer layer that contains an aqueous based ferrofluid in an amount sufficient to provide printed images that are recognizable by MICR devices.

It is the further object of the present invention to provide a thermal printer used in combination with a thermal transfer ribbon which contains an aqueous based ferrofluid in an amount sufficient to provide images that are recognizable by MICR.

These and other objects and advantages of the present invention will become apparent and further understood from the detailed description and claims which follow, together with the annexed drawings.

The above objects are achieved through the use of an aqueous based ferrofluid to provide magnetically responsive particles within the images, coating formulations, thermal transfer media and thermal printers of this invention.

There is provided by this invention a coating formulation which forms thermal transfer layers for thermal transfer media which transfer MICR recognizable images to a receiving substrate upon exposure to the print head of a thermal printer, said formulation comprising wax, binder resin, aqueous solvent and an aqueous based ferrofluid in an amount sufficient to provide thermal transfer layers that form printed images recognizable by MICR devices upon exposure to the print head of a thermal printer.

The formulation is preferably water-rich or water-based and the wax and binder resin are either water soluble, dispersible or emulsifiable and are sufficiently compatible such that the binder resin does not separate from an aqueous dispersion or emulsion containing both the wax and binder resin. Most preferably, the wax and binder resin are comprised of a water dispersible or emulsifiable wax and a water soluble, dispersible or emulsifiable binder resin, respectively. The wax and binder resin preferably have similar softening points so as to easily transfer from the flexible substrate to the synthetic receiving substrate upon exposure to a print head of a thermal transfer printer.

In another aspect of the present invention, there is provided a thermal transfer medium which transfers MICR readable images to a receiving substrate when exposed to the print head of a thermal printer, said thermal transfer medium comprising a flexible substrate with a thermal transfer layer positioned thereon, said thermal transfer layer comprising wax, binder resin, sometimes residual solvent, and a pigment comprising an aqueous based ferrofluid.

An additional aspect of this invention is a printed image which is recognizable by MICR devices obtained from thermal transfer printing, wherein said printed image comprises a patterned layer which is MICR readable positioned on a receiving substrate; said patterned layer comprising wax, binder resin and a pigment which comprises an aqueous based ferrofluid.

A further aspect of the present invention is a thermal printer used in combination with a thermal transfer ribbon which contains an aqueous based ferrofluid in an amount sufficient to provide images that are recognizable by MICR devices.

DETAILED DESCRIPTION OF THE PREFERRED EMBODIMENTS

Figure 1:
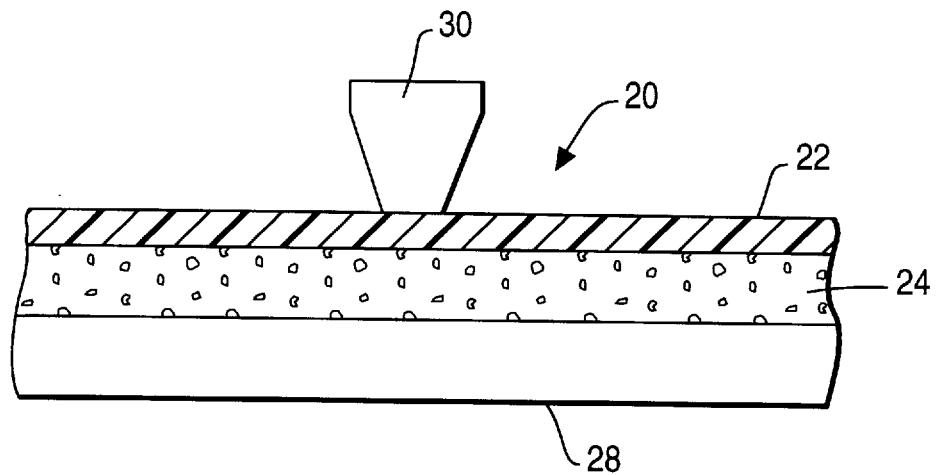
FIG. 1 illustrates a thermal transfer medium of the present invention in a printing operation prior to thermal transfer.

The coating formulation of this invention can comprise conventional components of coating formulations such as one or more waxes, binder resins, and solvents. However, the sensible material (pigment) employed is an aqueous based ferrofluid which renders the printed images obtained therefrom recognizable by magnetic ink character recognition (MICR) devices. The coating formulation of this invention contains the above-identified solid materials in a solution, dispersion or emulsion.

Ferrofluids suitable for use in this invention are those classified as aqueous ferrofluids which comprise suspensions/dispersions/emulsions of magnetic particles, i.e., iron oxide particles such as Magnetite ($Fe_3O_4$), coated with a hydrophilic coating. The coating preferably reduces agglomeration of the magnetic particles. Such ferrofluids are known to be stable in water, i.e., homogeneously mixed with water in the preparation of magnetic tapes such as audio and video tapes. Suitable aqueous based ferrofluids include those disclosed by Thakur et al. in U.S. Pat. No. 5,240,626. The colloidal suspension provided by Thakur et al. comprises magnetic particles (iron oxide/Magnetite-$Fe_3O_4$) which are coated with a carboxy functional polymer as an anti-agglomerating agent and preferably dispersed with the aid of a surfactant pair or surfactant and dispersant. The preferred sizes for these magnetic particles range from 20–200Å, most preferably 20–90Å. Examples of suitable carboxy functional polymers include polymers with multiple carboxy groups in salt form (COO-M+) based on acrylic acid, isocrotonic acid, allylacetic acid, fumaric acid, maleic acid, citraconic acid, itaconic acid, vinyl acetic acid, methacrylic acid backbones and the like. The polymers preferably comprise between 20 and 40 wt. % carboxy groups. An example of a suitable commercially available polymer is Tamol-850, available from Rohm and Haas Co. The amount of polymer used preferably ranges from 50 to 95 wt. % of the weight of the magnetic particles (Magnetite).

The ferrofluid composition preferably contains a surfactant or dispersing agent to facilitate dispersion of the magnetic particles in the aqueous solution. Conventional anionic, cationic and non-ionic surfactants and dispersants are suitable. Most preferably, a surfactant pair (surfactant and dispersant) are used, one anionic and one non-ionic. These ferrofluids can be prepared by the conventional methods disclosed by Thakur et al. (U.S. Pat. No. 5,240,626).

Mixtures of aqueous ferrofluids are preferred. Suitable aqueous ferrofluids are available commercially from sources such as Georgia Pacific Corp.

The ferrofluids can be added to the formulation in a manner consistent with conventional methods for introducing conventional pigments. However, grinding is not a requirement so alternative (non-conventional) methods for preparing the coating formulations of this invention may also suitable. The amount of ferrofluid employed is such that it provides an amount of magnetic particles sufficient to provide printed images which are recognizable by MICR devices. The ferrofluid is preferably employed in an amount that provides magnetic particles in the range of about 20 to 60 wt. %, most preferably about 20 to 40 wt. %, based on the weight of dry components.

The coating formulations of this invention contain a water dispersible or emulsifiable wax as a main dry component. Such waxes can be natural waxes such as carnauba wax, candelilla wax, bees wax, rice bran wax; petroleum waxes such as paraffin wax; synthetic hydrocarbon waxes such as low molecular weight polyethylene and Fisher-Tropsch wax; higher fatty acids such as myristic acid, palmitic acid, stearic acid and behenic acid; higher aliphatic alcohols such as stearyl alcohol and esters such as sucrose fatty acid esters. Mixtures of waxes can also be used. Examples of preferred waxes are carnauba wax under the Slip-Ayd series of surface conditioners by Daniel Products Co. and low molecular weight polyethylene. The melting point of the wax falls within the range of from 50° C. to 250° C., preferably from 60° C. to 150° C. Waxes with melting points at the high end are advantageous in that they aid in the integrity of the printed image. The amount of wax used in the coating formulations of present invention is above 5 wt. % based on the dry ingredients, preferably 10 to 95 wt. %. Coating formulations typically comprise 20 to 55 wt. % total solids. This translates at least to 1 to 2 wt. % wax based on the total formulation. Preferred coating formulations have from 2–30 wt. % wax based on the total formulation. To aid in processing, rheology and compatibility with binder resin, micronized grades of wax are preferred.

The coating formulations of this invention also contain a water soluble, dispersible or emulsifiable binder resin. Suitable binder resins include thermoplastic resins. Suitable thermoplastic resins include those used in conventional coating formulations such as those described in U.S. Pat. Nos. 5,240,781 and 5,348,348 and the following: polyvinylchloride, polyvinyl acetate, vinyl chloride-vinyl acetate copolymers, polyethylene, polypropylene, polyacetal, ethylene-vinyl acetate copolymers, ethylene alkyl (meth)acrylate copolymers, ethylene-ethyl acetate copolymer, polystyrene, styrene copolymers, polyamide, ethylcellulose, epoxy resin, polyketone resin, terpene resin, petroleum resin, polyurethane resin, polyvinyl butyryl, styrene-butadiene rubber, nitrile rubber, acrylic rubber, ethylene-propylene rubber, ethylene alkyl (meth)acrylate copolymer, styrene-alkyl (meth)acrylate copolymer, acrylic acid-ethylene-vinyl acetate terpolymer, saturated polyesters and sucrose benzoate. Suitable saturated polyesters are further described in U.S. Pat. No. 4,983,446. Preferred thermoplastic binder resins include sucrose benzoate, polyethylene, polyketone resins and styrene copolymers. To obtain emulsions of binder resins which are insoluble or poorly soluble in water, the binder resin is typically ground to submicron size.

Preferred coating formulations may contain two or more resins to provide specific property profiles. For example, Piccotex resins by Hercules are hydrocarbon resins (vinyl toluene-alpha methyl styrene copolymers) that provide high hot tack properties which aid adhesion of the coating to the synthetic resin receiving substrate upon transfer. Polyethylene SL 300, a polyethylene resin emulsion of a small (submicron) particle size is a surface conditioner within the Slip-Ayd series by Daniel Products which provides slip or wax-like properties for transfer. These binder resins can be used together or with other resins to provide a specific property profile.

In addition to special properties such as these, the binder resin provides a higher melting point than the wax so that the image resulting therefrom exhibits high smear and scratch resistance. The binder resin has a melting/softening point of less than 300° C. and preferably in the range of 50° C. to 250° C. To provide high scratch and smear resistant images on synthetic resin substrates, the binder resin may comprise at least 25 wt. %, based on total dry ingredients, of the coating formulation. In preferred embodiments, the binder resin comprises 2 wt. % to 75 wt. % of the total dry ingredients. This translates to preferred coating formulations having at least 5 wt % to 10 wt % binder resin based on the weight of the total formulation, and preferred formulations having from 7 wt % to 35 wt % binder resin, based on the weight of the total formulation.

The binder resin is preferably compatible with the wax such that it does not separate out in aqueous dispersions or emulsions which contain 2 to 25 wt % wax, based on the total weight of said dispersion or emulsion. Such compatibility ensures a high loading of binder resin for producing images with high scratch and smear resistance. To enhance compatibility, i.e., minimize separation, it is preferable for the binder resin and wax particles in emulsions and dispersions to be submicron size particles.

The coating formulation of the present invention may contain another sensible material (pigment) to be used in addition to the ferrofluid which is capable of being sensed visually, by optical means, by magnetic means, by electroconductive means or by photoelectric means. This additional sensible material is typically a coloring agent such as a dye or pigment but may include magnetic particles to supplement the ferrofluid. Any coloring agent used in conventional ink ribbons is suitable, including carbon black and a variety of organic and inorganic coloring pigments and dyes. For example, phthalocyanine dyes, fluorescent naphthalimide dyes and others such as cadmium, primrose, chrome yellow, ultra marine blue, iron oxide, cobalt oxide, nickel oxide, etc. The total amount of sensible material, including the ferrofluid, is typically from about 5 to 60 parts by weight of the total dry ingredients for the coating formulation. The additional pigment can form 1 to 20%, preferably 5 to 15% of the total dry ingredients.

The coating formulation may contain plasticizers, such as those described in U.S. Pat. No. 3,663,278, to aid in processing of the thermal transfer layer. Suitable plasticizers are adipic acid esters, phthalic acid esters, ricinoleic acid esters, sebasic acid esters, succinic acid esters, chlorinated diphenyls, citrates, epoxides, glycerols, glycols, hydrocarbons, chlorinated hydrocarbons, phosphates, and the like. The plasticizer provides low temperature sensitivity and flexibility to the thermal transfer layer so as not to flake off the substrate.

The coating formulation may contain other conventional additives for thermal transfer media including flexibilizers such as oil, weatherability improvers such a UV light absorbers, and fillers. The coating may further contain surfactants and dispersants which aid dispersion of the iron oxide particles (Magnetite) of the ferrofluid.

The coating formulations of this invention contain the above identified solids in an aqueous solution, dispersion or emulsion, in that the ferrofluid is based on an aqueous solvent. Water preferably comprises at least 50% of the solvent liquid, i.e., the coating formulation is preferably water-based or water-rich. However, included in this invention are coating formulations wherein water is a minor portion of the total solvent. The organic solvents used are miscible with water and include alcohols such as propanol. While it is desirable to eliminate all organic solvent from the formulation, small amounts of organic solvent significantly enhance the stability and dispersion of solids in the formulation. Other suitable solvents include selected esters, ketones and ethers. The solids content of the coating formulation is typically within the range of 15 to 80 wt. % and more typically within the range of 20–55 wt. %. The solids content can be higher (up to 100%) where a hot melt formulation is used.

Preferred coating formulations comprise 10 to 95 wt. % wax, 40 to 75 wt. % binder resin and 20 to 60 wt. % ferrofluid based on the total weight of dry ingredients. A particularly preferred formulation is that containing a mixture of wax, an ethyl vinyl acetate copolymer binder resin and an aqueous based ferrofluid as pigment.

The coating formulation of the present invention can be prepared in conventional equipment, such as an attritor or ball mill, by combining the ingredients as dispersions to this equipment and agitating the same. The solids are typically added as dispersions at about 30 wt. % solids. The wax is typically added first and the remaining components are added with minor heating. The preferred method is to mix the solvent, wax components and binder resin at an elevated temperature, preferably about 65° C., for about 15 minutes, after which the aqueous based ferrofluid is added and the resulting mixture is ground in an attritor at an elevated temperature, preferably from about 60° C. to 65° C., for about two hours.

The thermal transfer medium of the present invention comprises a substrate, preferably a thin smooth paper or plastic-like material and a thermal transfer layer comprised of wax, binder resin, sometimes residual solvent and a ferrofluid pigment. Suitable waxes, binder resins and ferrofluids are as described above. Suitable substrate materials include tissue type paper materials such as 30–40 gauge capacitor tissue, manufactured by Glatz and polyester-type plastic materials such as 14–35 gauge polyester film manufactured by Dupont under the trademark Mylar®. Polyethylene naphthalate films, polyamide films such as nylon, polyolefin films such as polypropylene film, cellulose films such as triacetate film and polycarbonate films are also suitable. The substrates should have high tensile strength to provide ease in handling and coating and preferably provide these properties at minimum thickness and low heat resistance to prolong the life of heating elements within thermal print heads. The thickness is preferably 3 to 10 microns. If desired, the substrate or base film may be provided with a backcoating on the surface opposite the thermal transfer layer.

The thermal transfer layer is preferably obtained from the coating formulation of the present invention in the form of either a solution, dispersion or emulsion. The thermal transfer layer may contain all the additives and components suitable for the coating formulations described above. The presence of residual solvent is dependent on the effectiveness of drying step in forming the thermal transfer layer. Once applied to the substrate, a portion of the solvent can remain in the coating. The residual solvent is typically undesirable but it may aid in transferring the image.

The thermal transfer layer (functional layer) preferably has a softening point within the range of about 50° C. to 250° C. which enables transfer at normal print head energies which range from about 100° C. to 250° C. and more typically from about 100° C. to 150° C.

The thermal transfer layers can be prepared by conventional techniques and equipment such as a Meyer Rod or like wire round doctor bar set up on a conventional coating machine to provide the coating weights described below. The coating weight of the thermal transfer layer typically ranges from 1.9 to 8.0 g/m$^2$. A temperature of about 65° C. is maintained during the entire coating process. After the coating formulation is applied, it is optionally passed through a dryer at an elevated temperature to ensure drying and adherence of the functional layer to the substrate. The thermal transfer layer can be fully transferred onto a receiving substrate such as paper or synthetic resin at a temperature in the range of 75° C. to 200° C.

The thermal transfer media of the present invention provides the advantages of thermal printing while providing printed images which are recognizable by MICR devices. When the thermal transfer media (ribbon) is exposed to the heating elements of the thermal print head, the thermal transfer layer softens and transfers from the medium (ribbon) to the receiving substrate with the ferrofluid therein.

Figure 2:
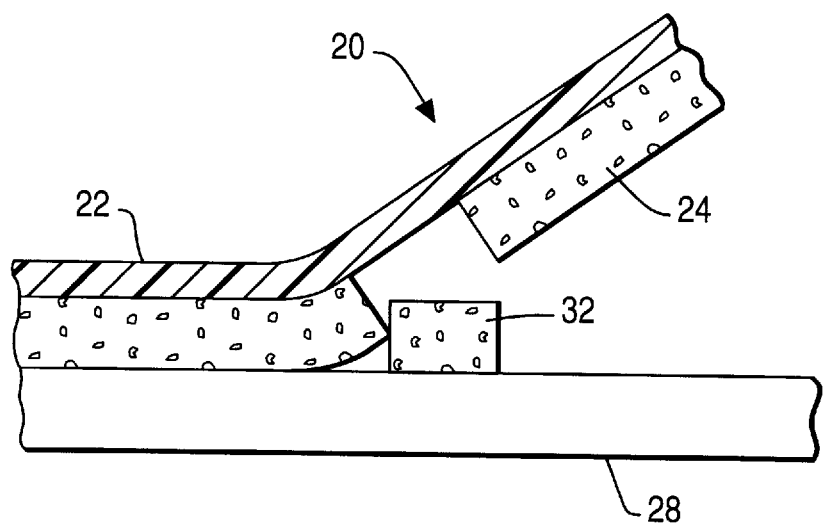
FIG. 2 illustrates a thermal transfer medium of the present invention in a printing operation after thermal transfer.

Illustrated in FIGS. 1–2, is a preferred thermal transfer ribbon 20, of this invention, which comprises substrate 22 of a flexible material which is preferably polyethylene terephthalate.

Positioned on substrate 22 is thermal transfer layer 24. The thermal sensitivity of thermal transfer layer 24 is determined by the softening point of the binder resin and wax. This thermal transfer layer has a softening point below 250° C., preferably below 200° C. and most preferably from 50° C. to 125° C. Softening temperatures within this range enable the thermal transfer medium to be used in conventional thermal transfer printers, which typically have print heads which operate at temperatures in the range of 50° C. to 250° C., more typically, temperatures in the range of 60° C. to 125° C. The thermal transfer layer preferably contains a wax and binder resin which are compatible so that exposure to heat from print head 30 uniformly transfers thermal transfer layer 24 from substrate 22 to synthetic resin receiving substrate 28 and form printed image 32.

Preferred thermal transfer media contain thermal transfer layers which comprise 10 to 80 wt. % wax, 40 to 75 wt. % binder resin and 20 to 60 wt. % magnetic particles of the ferrofluid based on the total weight of dry ingredients.

There is provided by this invention thermal transfer printers which employ the thermal transfer media of this invention. All hardware and software for the equipment can be conventional except for the thermal transfer media of this invention employed within the printer.

The printed images of this invention are preferably derived from thermal transfer media of this invention following transfer by a thermal transfer printer. These printed images comprise a single layer of the wax, binder resin and ferrofluids as described above in the amounts described above for the coating formulations and thermal transfer media of this invention. This layer is derived from a thermal transfer layer of a thermal transfer medium following exposure to a print head of a thermal printer. The printed images of this invention are recognizable by MICR devices. These printed images can be patterned to the fine detail which is necessary for MICR recognition.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

The entire disclosure of all applications, patents and publications, cited above and below, are hereby incorporated by reference.

EXAMPLES

Example 1

A coating formulation of the present invention can be prepared by adding the following ingredients in Table 1 to a quart sized vessel with propeller and mixed for about 10–15 minutes.

The ferrofluid comprises Magnetite iron oxide at a particle size in the range of 20–200 Å coated with a polymethylmethacrylate polymer consistent with examples 3 an 4 of Thakur et al. (U.S. Pat. No. 5,240,626). The polymer comprises about 30 wt. % carboxy groups of the formula COO-Na+ and is available from Rohm and Haas Co. under the trade name Tamol-850. The amount used falls within the range of 50 to 95 wt. % of the Magnetite.

TABLE 1

| Ingredient | Percent Dry | Wet Amount | Range (% Dry) |
|---|---|---|---|
| Michem Emulsion #15625 (25% Solids) | 20 | 80.0 | 10–30 |
| Michem Emulsion #65625 (25% Solids)1 | 8 | 32.0 | 3–12 |
| Pearson Stevens Adhesive Emulsion #B72J6A (44% Solids)² | 2 | 4.5 | 1–7 |
| Ferro Fluid (30% Solids)³ | 70 | 233.3 | 40–85 |
| Water | — | 150.2 | To make final solids 20% |
| Totals | 100 | 500 | |

¹Michelman, Inc., 9080 Shell Road, Cincinnati, OH 45236
²Pearson Stevens, P.O. Box 1092, Buffalo, NY 14240
³Georgia-Pacific Corporation, P.O. Box 1236, Bellingham, WA 98227

Preparation of a Thermal Transfer Ribbon and Image

The formulation of Example 1 can be coated on polyester (polyethyleneterephthalate) film at about a 1.9–8.0 g/m² coat weight and dried to obtain a thermal transfer ribbon of the present invention. This ribbon is well suited for printing bar codes using a TEC B-30 thermal transfer printer at +2 V setting.

The preceding example can be repeated with similar success by substituting the generically or specifically described reactants and/or operating conditions of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A thermal transfer medium comprising a flexible substrate and a thermal transfer layer positioned thereon having a softening point in the range of 50° C. to 250° C., said thermal transfer layer comprising wax, binder resin and a ferrofluid comprising magnetic particles with a hydrophilic coating in an amount sufficient to render the printed images therefrom recognizable by MICR devices, wherein said ferrofluid is derived from an aqueous ferrofluid.

2. A thermal transfer medium as in claim 1, wherein the thermal transfer layer contaains a colored pigment in addition to the magnetic particles of the ferrofluid.

3. A thermal transfer medium as in claim 1, wherein the wax has a melting point in the range of 40° C. to 130° C.; and the binder resin is a thermoplastic polymer resin having a melting point in the range of 100° C. to 250° C. and comprises 2 to 35 wt. % of the dry components.

4. A thermal transfer medium comprising a flexible substrate and a thermal transfer layer positioned thereon having a softening point in the range of 50° C. to 250° C., wherein said thermal transfer layer comprises wax, binder resin and a ferrofluid which provides 20–60 wt. % magnetic particles with a hydrophilic coating, based on total dry components of said thermal transfer layer wherein said ferrofluid is derived from an aqueous ferrofluid.

5. A thermal transfer medium as in claim 4 which comprises 2 to 75 wt. % thermoplastic polymer resin, 10 to 80 wt. % wax, 20 to 60 wt. % magnetic particles from said ferrofluid and 5 to 15 wt. % of a colored pigment, all based on total dry components of said thermal transfer layer.

6. A thermal transfer medium as in claim 4, wherein the magnetic particles of the ferrofluid comprise iron oxide particles of a size in the range of 20–200 Å coated with a hydrophilic coating.

7. A thermal transfer medium as in claim 4, wherein the iron oxide particles of the ferrofluid are Magnetite ($Fe_3O_4$) particles coated with a carboxy functional polymer.

8. A thermal transfer medium as in claim 4, wherein the thermal transfer layer has a coat weight within the range of 4.3–8.0 g/m².

9. A thermal transfer medium as in claim 4, which additionally contains colored pigment in the amount of 5 to 15 wt. % based on total dry components of thermal transfer layer.

10. A thermal transfer medium as in claim 4, wherein the binder resin is derived from a solution, emulsion or dispersion of particulates of submicron particles size.

11. A thermal transfer medium as in claim 4, wherein the binder resin is selected from the group consisting of sucrose benzoate, polyketone resins and styrene copolymers.

12. A thermal transfer medium as in claim 4, wherein the wax is derived from water dispersible or emulsifiable particulates of submicron size.

* * * * *